(12) United States Patent
Zhang

(10) Patent No.: US 9,194,551 B1
(45) Date of Patent: Nov. 24, 2015

(54) ROTARY IMAGE PROJECTOR

(71) Applicant: GEMMY INDUSTRIES CORPORATION, Coppell, TX (US)

(72) Inventor: Cheng-Chun Zhang, Shenzhen (CN)

(73) Assignee: Gemmy Industries Corporation, Coppell, TX (US)

( * ) Notice: Subject to any disclaimer, the term of this patent is extended or adjusted under 35 U.S.C. 154(b) by 0 days.

(21) Appl. No.: 14/337,662

(22) Filed: Jul. 22, 2014

(51) Int. Cl.
G03B 21/14 (2006.01)
F21S 10/00 (2006.01)
G03B 21/20 (2006.01)
G03B 23/08 (2006.01)
F21Y 101/02 (2006.01)

(52) U.S. Cl.
CPC .............. *F21S 10/007* (2013.01); *G03B 21/142* (2013.01); *G03B 21/145* (2013.01); *G03B 21/2033* (2013.01); *G03B 23/08* (2013.01); *F21Y 2101/02* (2013.01)

(58) Field of Classification Search
USPC ........ 353/120, 103, 108, 119; 362/97.3, 97.4, 362/249.02, 800; 40/431, 442
See application file for complete search history.

(56) References Cited

U.S. PATENT DOCUMENTS

| | | | |
|---|---|---|---|
| 7,357,520 B2* | 4/2008 | Vitantonio et al. | 353/119 |
| 9,068,726 B2* | 6/2015 | Zhang | 1/1 |
| 2015/0159842 A1* | 6/2015 | Zhang | F21V 21/30 |
| 2015/0184844 A1* | 7/2015 | Zhang | F21V 33/00 |

* cited by examiner

*Primary Examiner* — William C Dowling
(74) *Attorney, Agent, or Firm* — Tracy M. Heims; Apex Juris, pllc

(57) ABSTRACT

A rotary image projector has a dynamic image projector. A lens set is mounted inside a front portion of a housing of the dynamic image projector, and a motor, a slide assembly and a light-casting assembly is mounted inside a rear portion of the housing. The slide assembly is mounted on a spindle of the motor and is located between the light-casting assembly and the lens set. The motor drives the slide assembly to rotate to vary a position of the slide assembly aligning to the light-casting assembly in generation of dynamic images. The projector further has a transparent inflatable figure inflated by a blower for demonstration. The dynamic image projector is mounted on the transparent inflatable figure and the inflatable figure serves as a projection screen for the dynamic image projector projects a movable dynamic image on the inflatable figure.

20 Claims, 5 Drawing Sheets

ROTARY IMAGE PROJECTOR

BACKGROUND OF THE INVENTION

1. Field of the Invention

The present invention relates to an imaging device, and more particularly to a rotary image projector capable of generating projection effect of a rotated dynamic image.

2. Description of the Related Art

A conventional image projector normally has a housing, a lens set, an illumination assembly and slides. The lens set is mounted in a front portion of the housing. The illumination assembly is securely mounted inside the housing and has a lighting end facing the lens set. The slides have images thereon and are mounted between the lighting end of the illumination assembly and the lens set. Light emitted from the illumination set travels to the lens set through the slides. The lens set enlarges and projects the images of the slides on a projection screen.

However, the images projected through the conventional image projector are static and stationary during the course of projection and fail to demonstrate diversified and lively image variation.

Moreover, inflation figures found in event venues, such as exhibitions, fairs and the like, are inflated by a blower to generate preset three-dimensional forms of their own. When operated in the night or in a dark environment, the inflation figures usually count on additional illumination provided by surrounding projection lighting. Despite projection of the inflation figures under the additional illumination, the projection of the inflation figures lack dynamic and entertaining effect for the sake of stationary forms thereof.

SUMMARY OF THE INVENTION

An objective of the present invention is to provide a rotary image projector demonstrating diversified and lively variation of images.

To achieve the foregoing objective, the rotary image projector has a dynamic image projector.

The dynamic image projector has a housing, a lens set, a power supply, a motor, a light-casting assembly and a slide assembly.

The housing has a chamber and a light-projecting bore.

The chamber is defined in the housing.

The light-projecting bore is formed through a front portion of the housing to communicate with the chamber.

The lens set is mounted inside the light-projecting bore of the housing and has multiple convex lenses axially arranged inside the light-projecting bore and is aligned in a straight line.

The power supply is mounted inside a rear portion of the housing, and is electrically connected to an external power cord penetrating through the housing.

The motor is cylindrical, is mounted inside the housing, is electrically connected to the power supply, and has a spindle extending beyond a front face of the motor.

The light-casting assembly is mounted inside the housing and on a curve surface of the motor, and has a light-emitting diode (LED) lighting module and a focusing element.

The LED lighting module faces the convex lenses of the lens set and the light-projecting bore of the housing.

The focusing element is mounted in a front portion of the LED lighting module.

The slide assembly has two transparent pressing sheets and a transparent pattern sheet.

The transparent pattern sheet is sandwiched by the two transparent pressing sheets.

The transparent pressing sheets and the transparent pattern sheet are jointly and securely mounted on the spindle of the motor, and the transparent pattern sheet and the transparent pressing sheets are located between the light-casting assembly and the lens set.

Preferably, the rotary image projector further has a transparent inflatable figure and a blower.

The transparent inflatable figure has an inflation chamber defined therein.

The blower is connected to the inflatable figure to inflate the transparent inflatable figure to a preset figure.

The dynamic mage projector is mounted on the transparent inflatable figure.

The advantages of the foregoing rotary image projector reside in that the rotary image projector utilizes the light-casting assembly to emit light travelling to the lens set through the slide assembly for the lens set to project an image onto an external projection background, and simultaneously rotates the slide assembly using the motor by continuously varying positions of the image in the slide assembly casted by the light from the light-casting assembly to generate a rotated dynamic image with diversified and lively variation of the image.

Additionally, the rotary image projector can further have the transparent inflatable figure inflated by the blower for the purpose of demonstration. The dynamic image projector is mounted on the transparent inflatable figure and the transparent inflatable figure serves as a projection background such that the dynamic image projector projects the image on the transparent inflatable figure to generate a rotated dynamic image with diversified and lively variation of the image.

Other objectives, advantages and novel features of the invention will become more apparent from the following detailed description when taken in conjunction with the accompanying drawings.

DETAILED DESCRIPTION OF THE INVENTION

Figure 1:
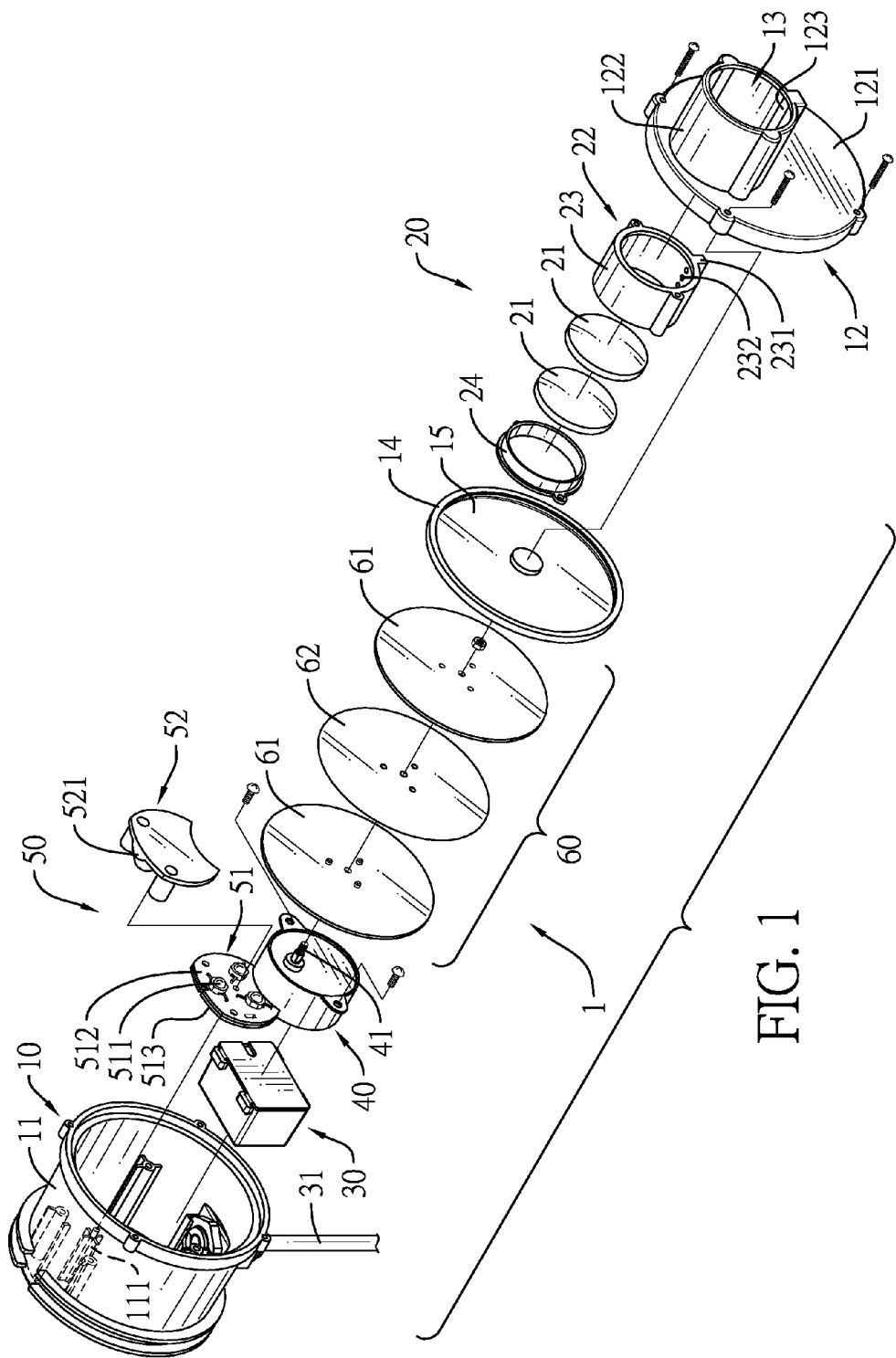
FIG. 1 is an exploded perspective view of a first embodiment of a rotary image projector in accordance with the present invention.
Figure 2:
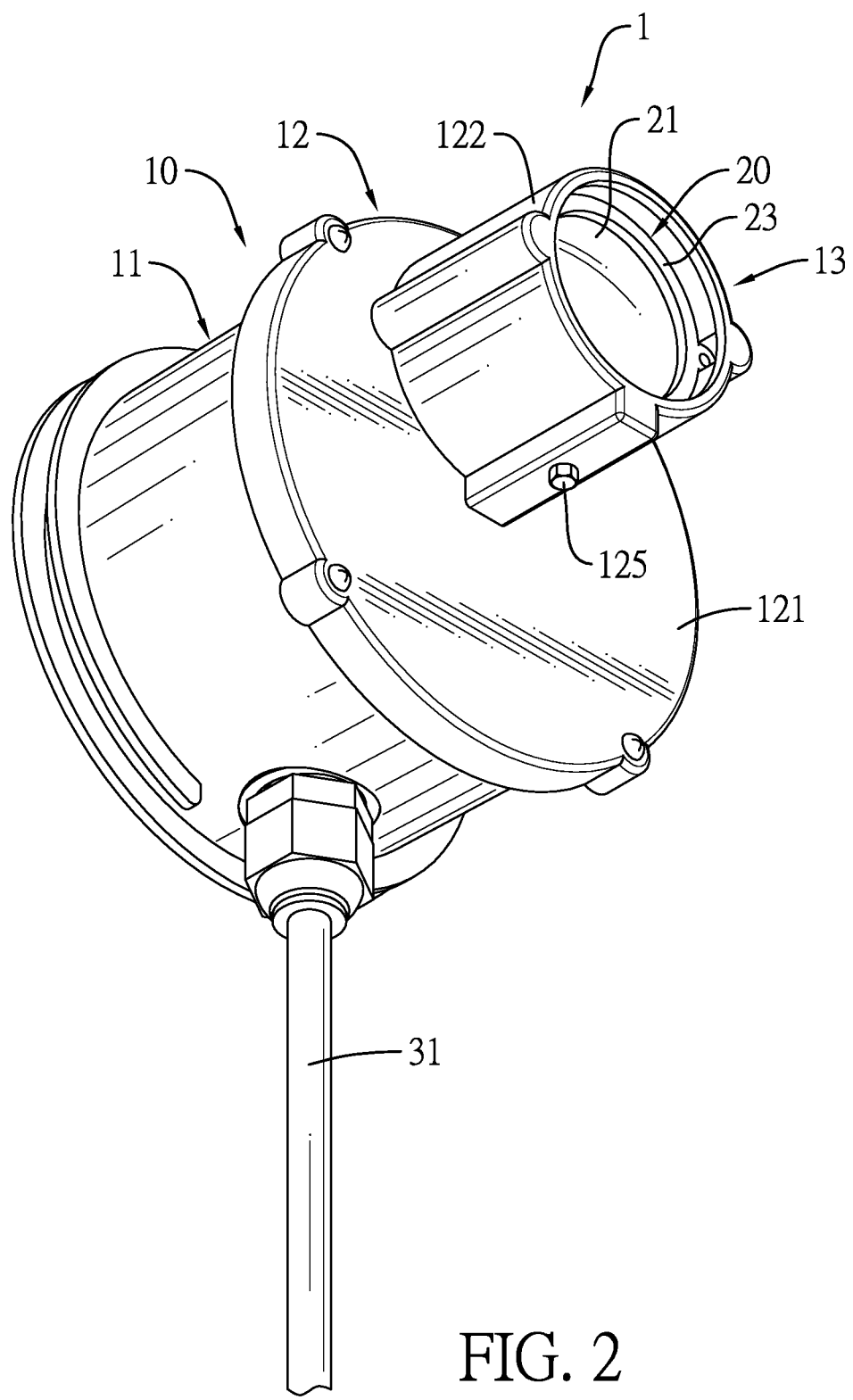
FIG. 2 is a perspective view of the rotary image projector in FIG. 1.

With reference to FIGS. 1 and 2, a first embodiment of a rotary image projector in accordance with the present invention includes a dynamic image projector 1. The dynamic image projector 1 has a housing 10, a lens set 20, a motor 40, a power supply 30, a light-casting assembly 50 and a slide assembly 60.

Figure 3:
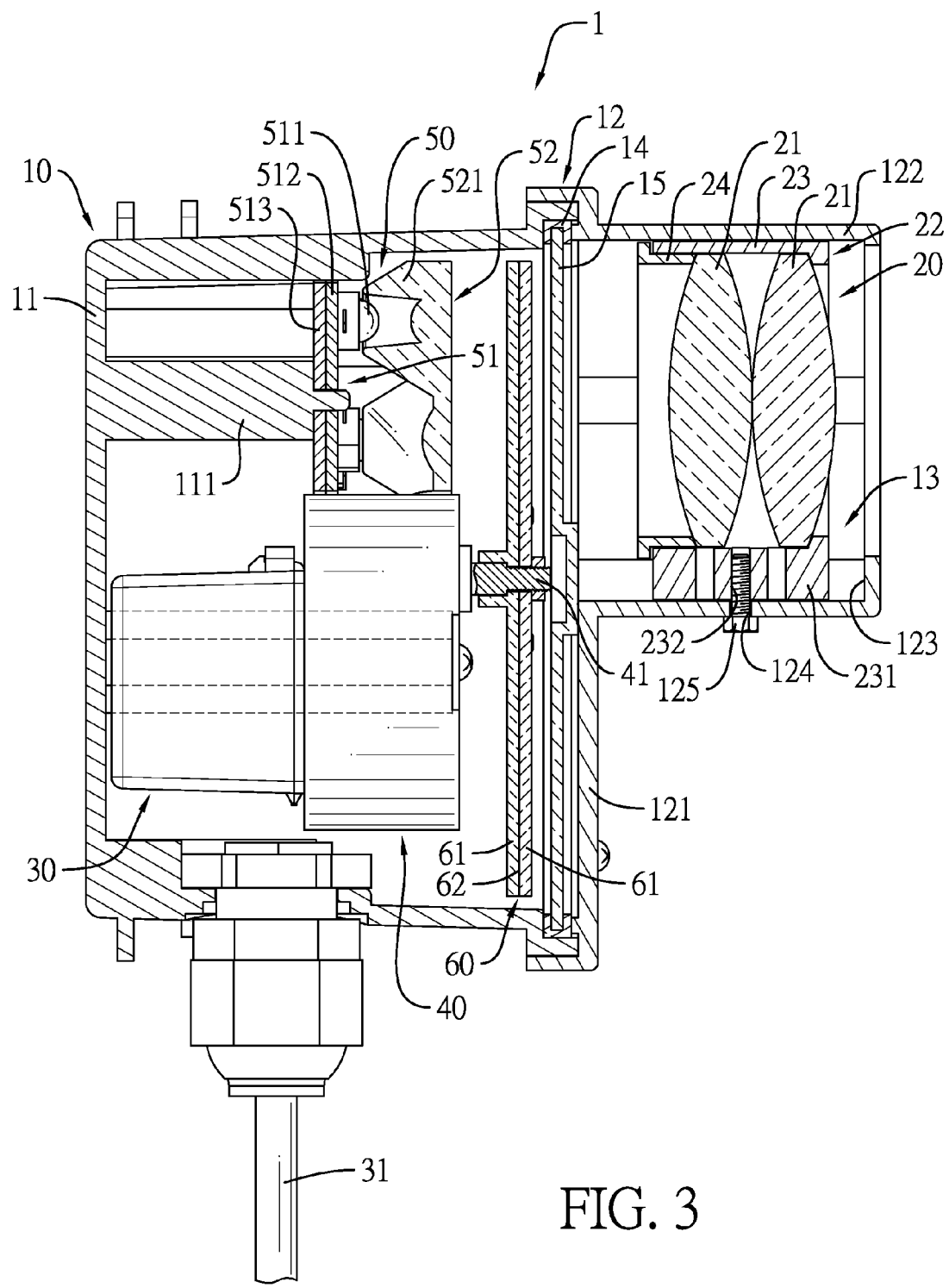
FIG. 3 is an enlarged side view in partial section of the rotary image projector in FIG. 2.

With reference to FIGS. 1 and 3, the housing 10 has a chamber defined therein and a light-projecting bore 13 formed through a front portion of the housing 10 to communicate with the chamber. In the present embodiment, the housing 10 has a base 11 and a cover 12. The base 11 is hollow and has an open side facing forwards. The cover 12 has the light-projecting bore 13 and is detachably mounted on the base 11 by a clamping means or by fasteners, such as screws, to cover the open side of the base 11. The housing 10 further has a waterproof seal 14 and a waterproof transparent plate 15 mounted between the base 11 and the cover 12. The waterproof seal 14 is held around a perimeter of the waterproof transparent plate 15.

The cover 12 has a covering portion 121 and a light-projecting portion 122. The covering portion 121 covers the open side of the housing 10. The light-projecting portion 122 is eccentrically formed on and protrudes forwards from a front side of the covering portion 121, and has the light-projecting bore 13 formed through the light-projecting portion 122. In the present embodiment, the light-projecting portion 122 is a circular tube and has at least one guiding slot 123 axially formed in an inner wall of the light-projecting portion 122 and extending across an axial length of the light-projecting portion 122.

The lens set 20 is mounted inside the light-projecting bore 13 of the housing 10, is located in front of the waterproof seal 14 and the waterproof transparent plate 15, and has multiple convex lenses 21 and a lens holder 22. The convex lenses 21 are axially arranged inside the light-projecting bore 13 and aligned in a straight line. The lens holder 22 is mounted and positioned inside the light-projecting portion 122 of the housing 10, and has a lens sleeve 23 and a collar 24. The lens sleeve 23 serves to receive the convex lenses 21 therein. The collar 24 is mounted on a rear end of the lens sleeve 23 to fix the convex lenses 21 inside the lens sleeve 23.

With reference to FIGS. 1, 2 and 3, the lens sleeve 23 has a guiding rib 231 formed on an outer wall of the lens sleeve 23 and corresponding to the guiding slot 123 of the light-projecting portion 122 of the cover 12. The lens set 20 can be positioned inside the light-projecting portion 122 of the housing 10. The light-projecting portion 122 further has a fixing hole 124 formed through a wall thereof. The lens sleeve 23 has multiple alignment holes 232 formed through a wall thereof and axially arranged in the form of a straight line across an axial length of the lens sleeve 23. When the lens set 20 is mounted inside the light-projecting portion 122 of the housing 10, a fastener 125, such as a pin, a screw or the like, is sequentially mounted through the fixing hole 124 of the light-projecting portion 122 and a selected one of the alignment holes 232 of the lens sleeve 23 to position the lens set 20 at a desired position inside the light-projecting portion 122 of the housing 10.

The power supply 30 is mounted inside a rear portion of the base 11 of the housing 10, and is electrically connected to an external power cord 31 penetrating through the base 11 for power connection to a power source.

The motor 40 is cylindrical, is mounted inside the base 11 of the housing, is electrically connected to the power supply 30, and has a spindle 41 extending beyond a front face of the motor 40.

Figure 4:
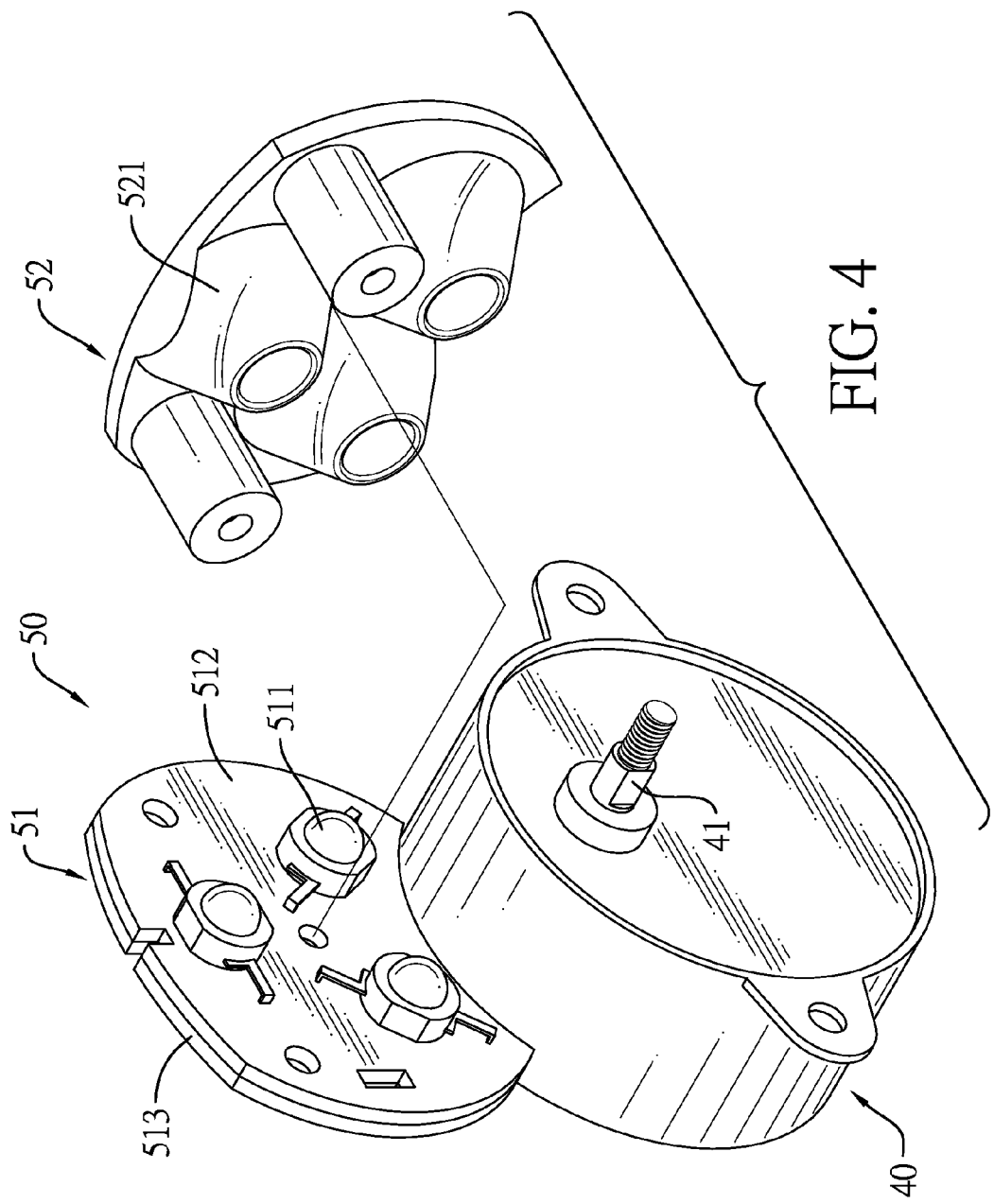
FIG. 4 is an enlarged exploded perspective view of a projection assembly and a motor of the rotary image projector in FIG. 2.

With reference to FIGS. 1, 3 and 4, the light-casting assembly 50 is mounted inside the base 11 of the housing 10 and is mounted on a curve surface of the motor 40 with a light-emitting side of the light-casting assembly 50 facing the convex lenses 21 inside the lens holder 22 and the light-projecting bore 13 of the housing 10. In the present embodiment, the light-casting assembly 50 has a light-emitting diode (LED) lighting module 51 and a focusing element 52. The LED lighting module 51 has a circuit board 512 and at least one LED formed on a front side of the circuit board 512. The LED lighting module 51 may further has a heat-insulating board 513 mounted on a rear side of the circuit board 512. The focusing element 52 is mounted in a front portion of the LED lighting module 51, and has at least one focusing cup 521. Each one of the at least one focusing cup 521 is aligned to a corresponding LED 511.

The slide assembly 60 has a transparent pattern sheet 62 and two transparent pressing sheets 61. The transparent pattern sheet 62 has a transparent image including pattern, texts or a combination of pattern and texts and is sandwiched by the two transparent pressing sheets 61. The transparent pressing sheets 61 and the transparent pattern sheet 62 are jointly and securely mounted on the spindle 41 of the motor 40. The transparent pattern sheet 62 and the transparent pressing sheets 61 are located between the light-casting assembly 50 and the lens set 20 such that different portions of the image on the transparent pattern sheet 62 can be rotated and casted by light emitted from the light-casting assembly 50 in generation of an effect of dynamically varying portions of the rotated image to be casted when the slide assembly 60 is driven by the motor 40. In the present embodiment, the slide assembly 60 is located behind the waterproof transparent plate 15. The slide assembly 60, the light-casting assembly 50, the motor and the power supply 30 are hermetically sealed inside the base 11 of the housing 10 by the waterproof transparent plate 15.

The base 11 also has multiple positioning columns 111 for the LED lighting module 51 and the focusing element 52 of the light-casting assembly 50 to be securely mounted on the positioning columns 111 by screws and for the light-casting assembly 50 to be fastened inside the base 11.

With reference to FIG. 3, when the rotary image projector is operated, the power supply 30 is connected to an external power source through the power cord 31 to supply power to the motor 40 and the LED lighting module 51 of the light-casting assembly 50. Thus, the LED lighting module 51 of the light casting assembly 50 is lit and light generated by the LED lighting module 51 sequentially passes through the at least one focusing cup 521 of the focusing element 52, the transparent pattern sheet 62 and the lens set 20 such that the image on the transparent pattern sheet 62 is projected out through the convex lenses 21 to generate an enlarged clear image on a projection background at a specified distance. Meanwhile, the motor 40 continuously drives the slide assembly 60 to rotate and portions of the image on the transparent pattern sheet 62 are alternately aligned to the light casted from the light-casting assembly 50 in generation of a dynamic imaging effect full of varied patterns or texts. Besides, the transparent pattern sheet 62 is replaceable so that different projected images can be obtained, and the LED lighting module 51 can be replaced to acquire light of different colors.

Figure 5:
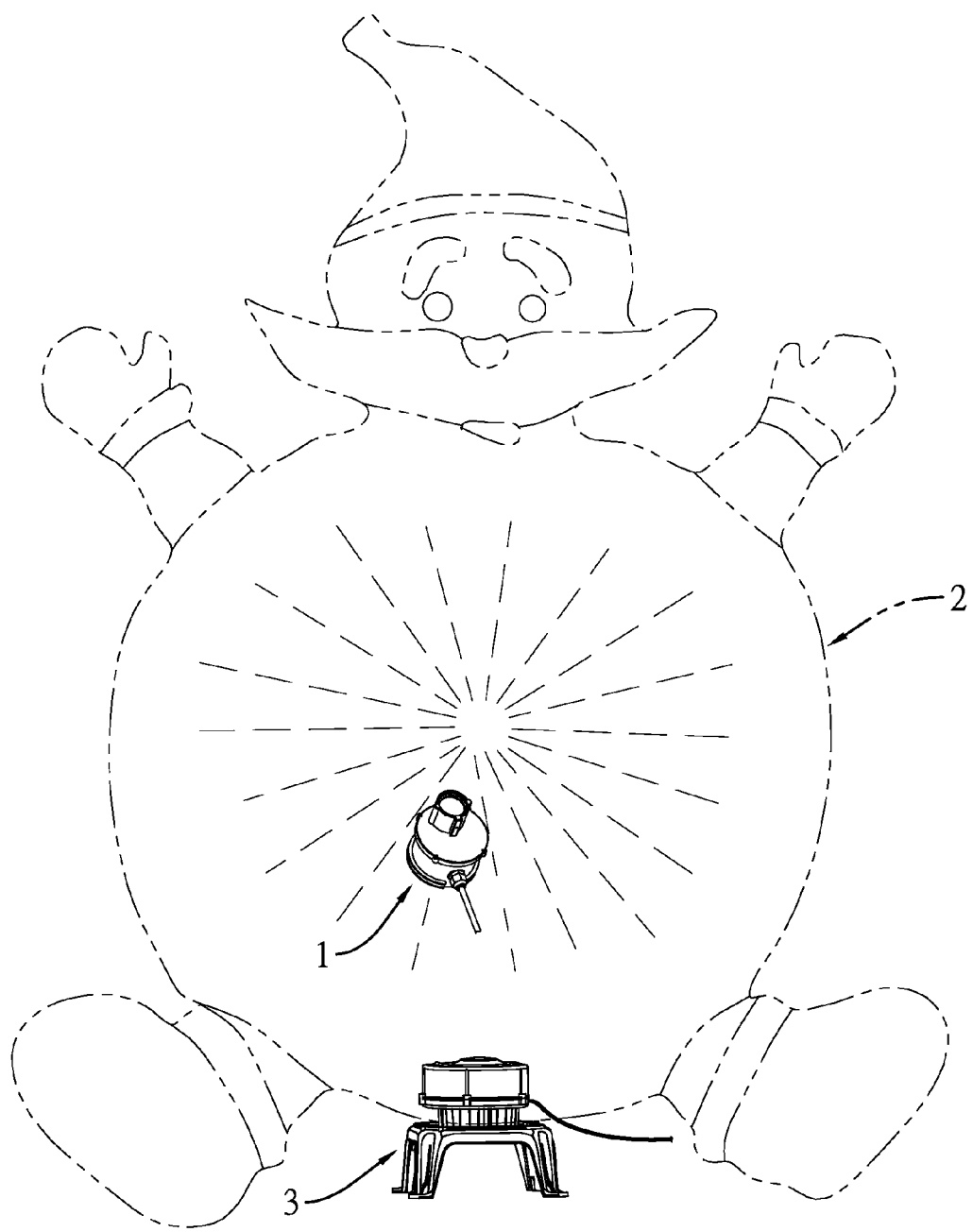
FIG. 5 is an operational perspective view of a second embodiment of a rotary image projector in accordance with the present invention.

With reference to FIG. 5, a second embodiment of a rotary image projector in accordance with the present invention further includes a transparent inflatable FIG. 2 and a blower 3. The transparent inflatable FIG. 2 has an inflation chamber defined therein. The blower 3 is connected to the inflatable FIG. 2 to inflate the transparent inflatable FIG. 2 to a preset figure for the demonstration purpose. The dynamic mage projector 1 is mounted on the transparent inflatable FIG. 2 with the light-projecting bore 13 facing the transparent inflatable FIG. 2. In the present embodiment, the dynamic mage projector 1 is mounted on a back of the transparent inflatable FIG. 2 such that besides the demonstration purpose, the inflated transparent inflatable FIG. 2 may serve as a projection background for the image projected by the dynamic mage projector 1 to be projected onto the transparent inflatable FIG. 2 to generate a movable dynamic image with diversified and lively variation of the image.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A rotary image projector, comprising:
   a dynamic image projector having:
      a housing having:
         a chamber defined therein; and
         a light-projecting bore formed through a front portion of the housing to communicate with the chamber;
      a lens set mounted inside the light-projecting bore of the housing and having multiple convex lenses axially arranged inside the light-projecting bore and aligned in a straight line;
      a power supply mounted inside a rear portion of the housing, and electrically connected to an external power cord penetrating through the housing;
      a motor being cylindrical, mounted inside the housing, electrically connected to the power supply, and having a spindle extending beyond a front face of the motor;
      a light-casting assembly mounted inside the housing and on a curve surface of the motor, and having:
         a light-emitting diode (LED) lighting module facing the convex lenses of the lens set and the light-projecting bore of the housing; and
         a focusing element mounted in a front portion of the LED lighting module; and
      a slide assembly having:
         two transparent pressing sheets; and
         a transparent pattern sheet sandwiched by the two transparent pressing sheets;
         wherein the transparent pressing sheets and the transparent pattern sheet are jointly and securely mounted on the spindle of the motor, and the transparent pattern sheet and the transparent pressing sheets are located between the light-casting assembly and the lens set.

2. The rotary image projector as claimed in claim 1, wherein the housing has:
   a base being hollow and having an open side facing forwards;
   a cover having the light-projecting bore and detachably mounted on the base to cover the open side of the base;
   a waterproof seal and a waterproof transparent plate mounted between the base and the cover, wherein the waterproof seal is held around a perimeter of the waterproof transparent plate, and the waterproof transparent plate is located between the lens set and the slide assembly.

3. The rotary image projector as claimed in claim 2, wherein
   the cover has:
      a covering portion covering the open side of the base; and
      a light-projecting portion eccentrically formed on and protruding forwards from a front side of the covering portion, and having the light-projecting bore formed through the light-projecting portion; and
   the lens set further has a lens holder mounted and positioned inside the light-projecting portion of the housing, wherein the lens holder has:
   a lens sleeve serving to receive the convex lenses therein; and
   a collar mounted on a rear end of the lens sleeve to fix the convex lenses inside the lens sleeve.

4. The rotary image projector as claimed in claim 3, wherein
   the light-projecting portion is a circular tube and has:
      a guiding slot axially formed in an inner wall of the light-projecting portion and extending across an axial length of the light-projecting portion; and
      a fixing hole formed through a wall of the light-projecting portion;
   the lens sleeve has:
      a guiding rib formed on a peripheral surface of the lens sleeve and corresponding to the guiding slot of the light-projecting portion of the cover; and
      multiple alignment holes formed through a wall of the lens sleeve and axially arranged in the form of a straight line across an axial length of the lens sleeve;
   when the lens set is mounted inside the light-projecting portion of the housing, a fastener is sequentially mounted through the fixing hole of the light-projecting portion and a selected one of the alignment holes the lens sleeve to position the lens set at a selected position inside the light-projecting portion of the housing.

5. The rotary image projector as claimed in claim 4, wherein the base has multiple positioning columns for the LED lighting module and the focusing element of the light-casting assembly to be securely mounted on the positioning columns by screws.

6. The rotary image projector as claimed in claim 1, wherein
   the LED lighting module has:
      a circuit board; and
      at least one LED formed on a front side of the circuit board; and
   the focusing element has at least one focusing cup, wherein each one of the at least one focusing cup is aligned to a corresponding LED.

7. The rotary image projector as claimed in claim 2, wherein
   the LED lighting module has:
      a circuit board; and
      at least one LED formed on a front side of the circuit board; and
   the focusing element has at least one focusing cup, wherein each one of the at least one focusing cup is aligned to a corresponding LED.

8. The rotary image projector as claimed in claim 3, wherein
   the LED lighting module has:
      a circuit board; and
      at least one LED formed on a front side of the circuit board; and
   the focusing element has at least one focusing cup, wherein each one of the at least one focusing cup is aligned to a corresponding LED.

9. The rotary image projector as claimed in claim 4, wherein
   the LED lighting module has:
      a circuit board; and
      at least one LED formed on a front side of the circuit board; and
   the focusing element has at least one focusing cup, wherein each one of the at least one focusing cup is aligned to a corresponding LED.

10. The rotary image projector as claimed in claim 5, wherein
    the LED lighting module has:

a circuit board; and
at least one LED formed on a front side of the circuit board; and
the focusing element has at least one focusing cup, wherein each one of the at least one focusing cup is aligned to a corresponding LED.

11. The rotary image projector as claimed in claim 6, wherein the LED lighting module further has a heat-insulating board mounted on a rear side of the circuit board.

12. The rotary image projector as claimed in claim 7, wherein the LED lighting module further has a heat-insulating board mounted on a rear side of the circuit board.

13. The rotary image projector as claimed in claim 8, wherein the LED lighting module further has a heat-insulating board mounted on a rear side of the circuit board.

14. The rotary image projector as claimed in claim 9, wherein the LED lighting module further has a heat-insulating board mounted on a rear side of the circuit board.

15. The rotary image projector as claimed in claim 10, wherein the LED lighting module further has a heat-insulating board mounted on a rear side of the circuit board.

16. The rotary image projector as claimed in claim 1, further comprising:
a transparent inflatable figure having an inflation chamber defined therein;
a blower connected to the inflatable figure to inflate the transparent inflatable figure to a preset figure;
wherein the dynamic mage projector is mounted on the transparent inflatable figure.

17. The rotary image projector as claimed in claim 2, further comprising:
a transparent inflatable figure having an inflation chamber defined therein;
a blower connected to the inflatable figure to inflate the transparent inflatable figure to a preset figure;
wherein the dynamic mage projector is mounted on the transparent inflatable figure.

18. The rotary image projector as claimed in claim 3, further comprising:
a transparent inflatable figure having an inflation chamber defined therein;
a blower connected to the inflatable figure to inflate the transparent inflatable figure to a preset figure;
wherein the dynamic mage projector is mounted on the transparent inflatable figure.

19. The rotary image projector as claimed in claim 4, further comprising:
a transparent inflatable figure having an inflation chamber defined therein;
a blower connected to the inflatable figure to inflate the transparent inflatable figure to a preset figure;
wherein the dynamic mage projector is mounted on the transparent inflatable figure.

20. The rotary image projector as claimed in claim 5, further comprising:
a transparent inflatable figure having an inflation chamber defined therein;
a blower connected to the inflatable figure to inflate the transparent inflatable figure to a preset figure;
wherein the dynamic mage projector is mounted on the transparent inflatable figure.

* * * * *